United States Patent
Matsuura et al.

(10) Patent No.: US 6,356,590 B1
(45) Date of Patent: Mar. 12, 2002

(54) MOTION VECTOR DETECTING DEVICE

(75) Inventors: Tadao Matsuura, Chiba; Yoichi Fujiwara, Ichihara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/165,151

(22) Filed: Oct. 2, 1998

(30) Foreign Application Priority Data

Oct. 8, 1997 (JP) .............................. 9-275511

(51) Int. Cl.[7] .................................. H04N 7/12
(52) U.S. Cl. .................. 375/240.16; 348/699
(58) Field of Search ............. 375/240.16, 240.17; 348/699, 416.1, 407.1, 413.1; 382/234, 236, 238; 358/430

(56) References Cited

U.S. PATENT DOCUMENTS

| 4,897,720 A | 1/1990 | Wu et al. ............. 348/412.1 |
| 5,400,087 A | 3/1995 | Uramoto et al. ....... 375/240.15 |
| 5,719,642 A | 2/1998 | Lee .......................... 348/699 |
| 6,058,142 A | * 5/2000 | Ishikawa et al. ....... 375/240.16 |
| 6,198,771 B1 | * 3/2001 | Iwata ...................... 375/240.16 |

FOREIGN PATENT DOCUMENTS

| EP | 0 613 293 A2 | 8/1994 | ............ H04N/7/12 |
| JP | 07288818 | 10/1995 | ............ H04N/7/32 |
| JP | 407288817 A | * 10/1995 | ............ H04N/7/32 |
| JP | 409023434 A | * 1/1997 | ............ H04N/7/32 |
| JP | 409182080 A | * 7/1997 | ............ H04N/7/32 |
| WO | 96/17322 | 6/1996 | ............ G06T/7/20 |

* cited by examiner

Primary Examiner—Vu Le

(57) ABSTRACT

An apparatus is provided to reduce the memory capacity required to hold the data of a search area when motion vector detection is conducted in a wider area by using a plurality of motion vector detecting circuits. A motion vector detecting device includes an object pixel memory, reference pixel memory, motion vector detecting circuits, and a vector selecting circuit. Data of different blocks are provided to each of motion vector detecting circuits from the object pixel memory. Data of common search areas are simultaneously provided to the motion vector detecting circuits from the reference pixel memory. Output from each of the motion vector detecting circuits is processed by the vector selecting circuit to provide a motion vector in a search area which is wider than the search area of each motion vector.

14 Claims, 11 Drawing Sheets t=t1 t=t2 t=t0 t=t0 t=t1 t=t2

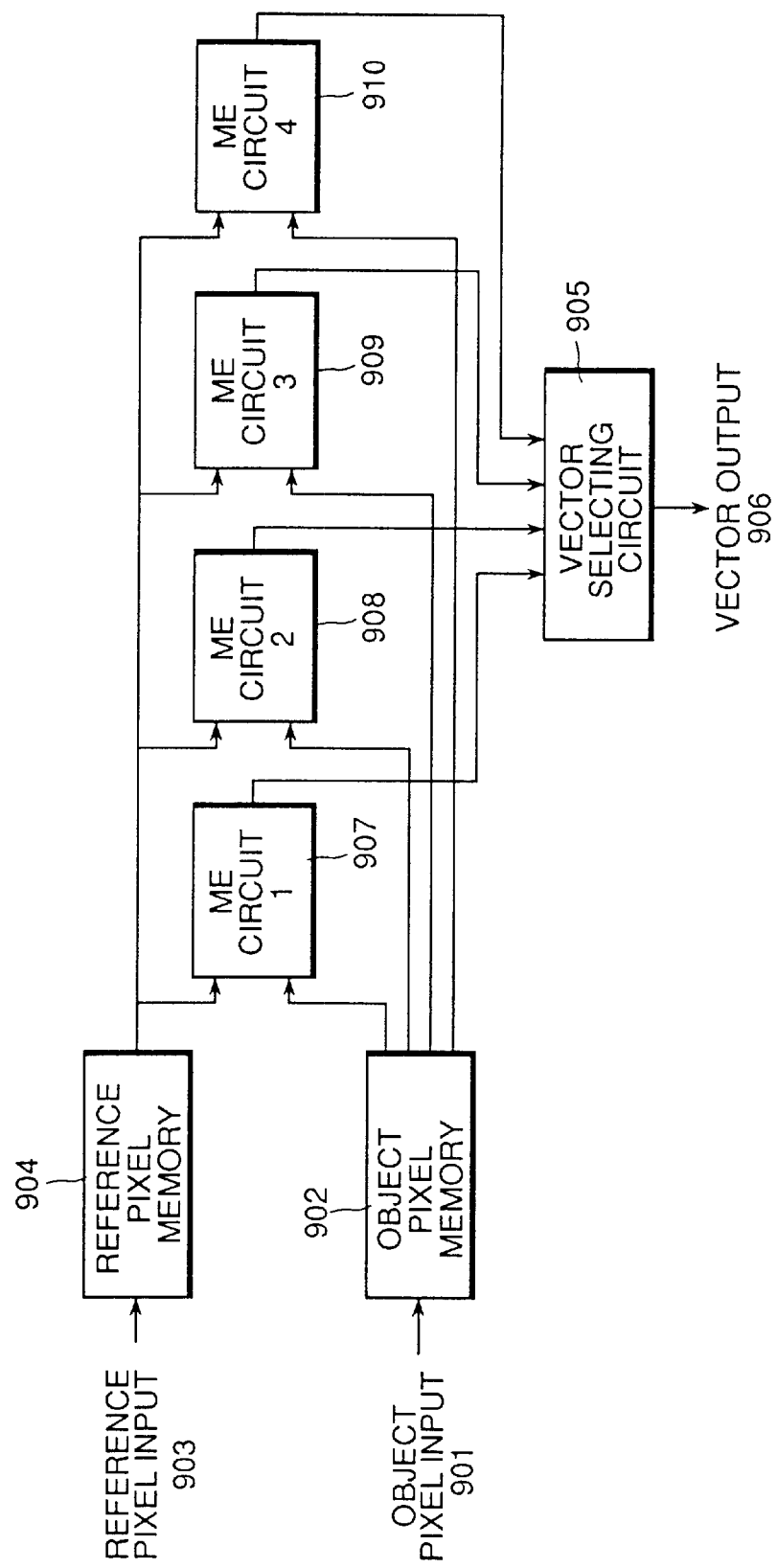

t=t1 t=t0 t=t2 t=t0+2tH t=t1+2tH t=t1(UL)  t=t1(UR)
t=t1+2tH(DL)  t=t1+2tH(DR)

t=t2+2tH

MOTION VECTOR DETECTING DEVICE

BACKGROUND OF THE INVENTION

The present invention relates to a motion vector detecting device used for motion picture encoding.

Detection of motion vectors is accomplished by using a block matching operation in motion picture compression techniques such as MPEG. This involves block matching between a block 103 in an object frame 101 to be encoded (hereinafter referred to as object block) and a block in a search area 104 in the other reference frame 102, both blocks being separated from each other with respect to time and detecting the relative position of the blocks having the highest correlation as a motion vector 105 as shown in FIG. 1.

If it is assumed that the dimension of the object block is 8 by 8 and the range of vector detection is +3 to −4 in both horizontal and vertical direction, the range of the reference pixels which are required for detecting a motion vector in one object block would be (8+3+4)×(8+3+4)=15×15. Hereinafter the necessary range of reference pixels will be referred to as "search area".

If the pixel values of the object block is represented as T(i) (i=0 . . . , 63) and the pixel values of one object block Rk is represented as Rk(j) (J=0 . . . , 63), the evaluation value of one block matching operation (AE) is represented by the following equation.

$$AEk = \sum_{i=0}^{63} |T(i) - Rk(i)|$$

In the equation, AEk denotes the evaluation value. The values are determined in the search area. The position of block which assumes the minimum value among the values is determined as a motion vector.

Encoding of a frame is conducted by sequentially performing such processing for the object block.

Since, for a fast moving picture, a wider detection range of the motion vector provides a higher encoding efficiency, a wider search area is more advantageous.

For this purpose, it is conceivable to widen the search area to assign the processing of the different search areas to each of a plurality of motion vector detecting circuits for the same object block.

This will be described with reference to the drawings.

FIG. 2 is a block diagram showing the prior art. The pixels of an object are input from 201 and are temporarily stored in an object pixel memory 202. The pixels of a reference frame are input from 203 and are stored in reference pixel memories 204 through 205.

n denotes the number of ME circuits. Vector detection is carried out by providing the pixel data to motion vector detecting circuits (hereinafter abbreviated as "ME circuit") 206 to 207 according to a predetermined sequence.

Based on the results from these ME circuits, the minimum value of AE is ultimately determined as a motion vector by a vector selecting circuit 208 and is output from 209.

The way of the operation will be described in detail with reference to drawings. It is assumed that the dimension of an object block is m by m pixels and dimension of a search area is 3m by 3m pixels. It is also assumed that each of the ME circuits be capable of conducting vector detection in a search area of 3m by 3m pixels for a block of m by m pixels.

Now, a case in which n=1, that is, only one ME circuit is provided, will be described with reference to FIG. 3. A half tone dotted block in FIG. 3 denotes an object block and the area which is encircled by a solid line around the object block is a search area.

Motion vector detection is conducted by controlling the device to apply the object block data and the search area data to the ME circuit 206. At time t0 in FIG. 3A, the motion vector for the object block 301 in position i is detected at its periphery 302.

At the t1 which is subsequent block processing time, the motion vector for the object block 303 in position i+1 is detected in its peripheral search area 304 as shown in FIG. 3B.

Similarly, motion vectors will be successively determined for blocks in position i+2, i+3, . . . so on.

Since only one ME circuit is provided in this example, no vector selecting circuit 208 is necessary and an output of the ME circuit may be output as a result as it is.

Now, a case in which the search area is widened by providing two ME circuits (n=2) will be described with reference to FIG. 4.

In this case, the object block is a netted block 40 as is similar to the former case. The search area is widened by assigning the search area to each of two ME circuits.

In FIG. 4A, the whole search area 202 is divided into sub-search areas 403 and 404. The respective data are separately applied to ME circuits 206 and 207 from the reference pixel memories 204 and 205 in FIG. 2, respectively. The data of the object block 401 is simultaneously applied to both ME circuits from the object pixel memory 202. Motion vectors of difference search areas can be determined by respective circuits.

The motion vectors and the evaluation values of the block matching (for example AE) are input to the vector selecting circuit 208 and a motion vector having less evaluation value is ultimately output from 209.

The above-mentioned operation allows the motion vector to be detected from a search area having 5m by 3m pixels for the object block of m by m pixels.

The search areas 403 and 404 partially overlap with each other. It is apparent that an area which is wider by one block width could be covered if the search areas were assigned so that they did not overlap with each other as shown in FIG. 4B. Such assignment is impossible since motion vector detection can not be performed for a candidate block in position 409.

The reason why such assignment is impossible is that the right end position of the candidate block in the left sub-search area 405 is a position in 406 and the left end position of the candidate block in the right sub-search area 407 is a position 408 and thus detection of a motion vector could not be performed for either sub-search area, for example, for the candidate block in position 409.

Motion vectors can be detected from a wider search area than that in FIGS. 3A to 3C by successively repeating the above-mentioned operation for each object block as is similar to FIGS. 3A to 3C.

A motion vector detecting device which is based upon the above-mentioned concept is disclosed in Japanese laid-Open Patent Publication No. 7-288818.

In the embodiment of the invention disclosed in the cited Japanese Patent Publication, widening of the search area is achieved by dividing the search area into four sub-areas, applying respective data on the sub-areas to respective different ME circuits and applying data on object blocks to respective ME circuits while delaying them appropriately, resulting in reduction in hardware.

In the above-mentioned method, the memory capacity increases in proportion with the search area since it is necessary to store all pixel data of the search areas in memories. Since a longer period of time is taken for the pixel data to be transferred to a reference pixel memory, longer period of time for processing is required.

SUMMARY OF THE INVENTION

It is an object of the present invention to provide a motion vector detecting device comprising an object pixel memory for holding pixels of an object block to be encoded; a reference pixel memory for holding pixels of a search area of a reference frame; a plurality of motion vector detecting circuit having a predetermined search area; and a motion vector selecting circuit for selecting optimal motion vector from the outputs from said motion vector detecting circuits, and characterized in that the pixel data of different object block are applied to the plurality of vector detecting circuits from said object pixel memory, in that the pixel data of the predetermined search area are commonly applied to all motion vector detecting circuit from said reference pixel memory, whereby a motion vector can be detected in a wider area by selecting/comparing output from the plurality of motion vector detecting circuits by said motion vector selecting circuit in an appropriate timing relationship.

BRIEF DESCRIPTION OF THE DRAWINGS

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

FIG. 9 is a block diagram showing the configuration of a second embodiment of the present invention.

PREFERRED EMBODIMENT OF THE INVENTION

Now, a mode of embodying the invention will be described. An embodiment, in which the object block comprises m by m pixels, and the range of the search area comprising 3m by 3m pixels as is similar to the prior art is detected by one ME circuit, will be described.

Figure 1:
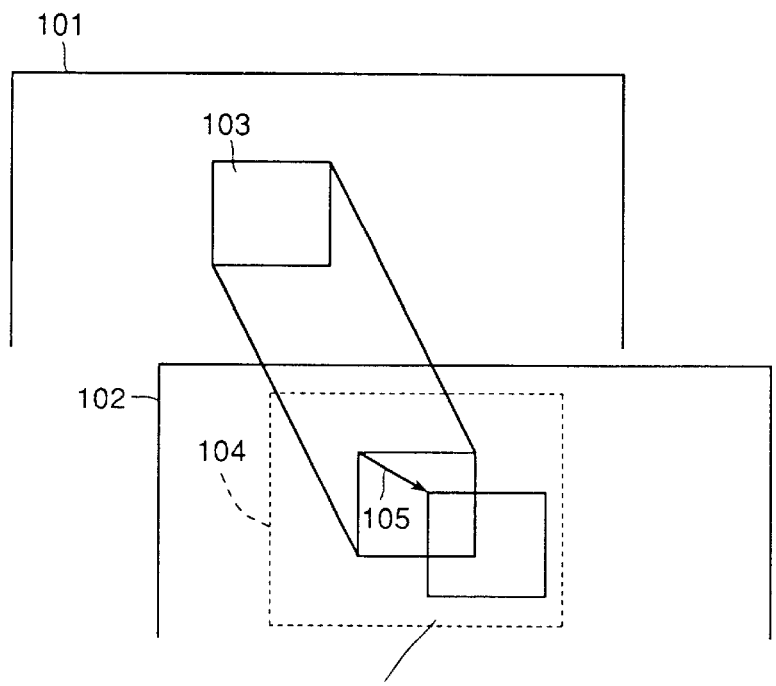
FIG. 1 is a view showing the concept of the motion vector detection.
Figure 2:
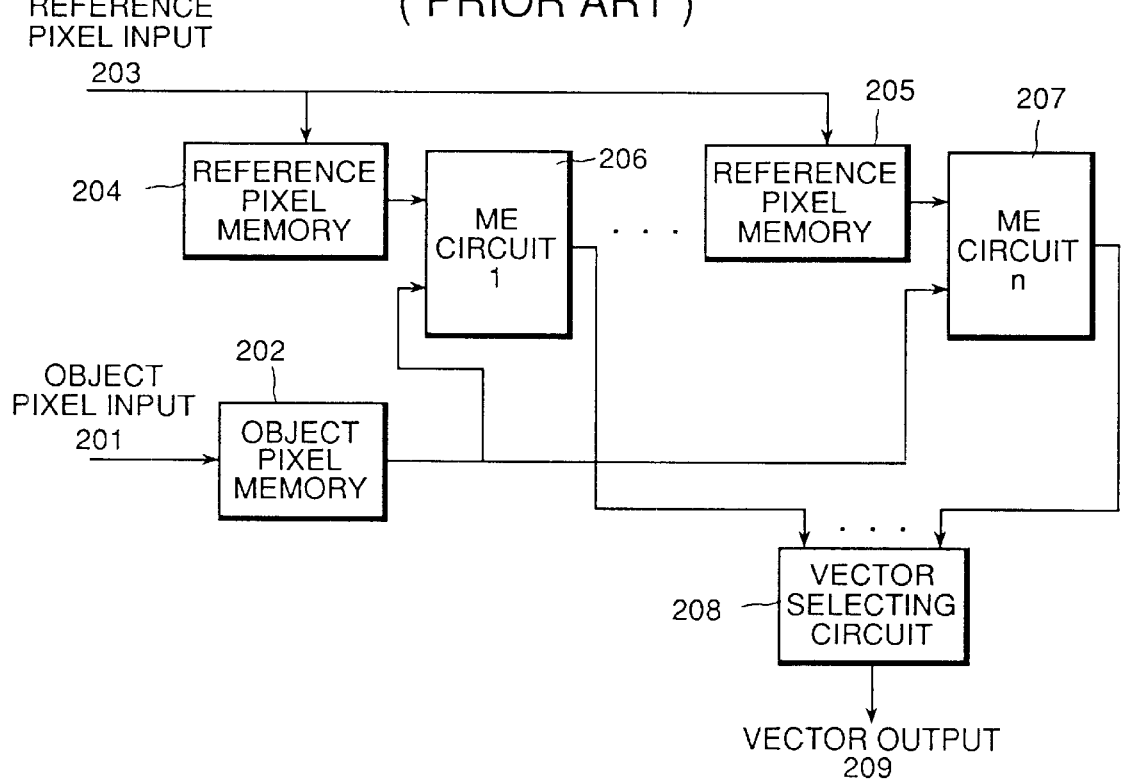
FIG. 2 is a block diagram showing the configuration of the prior art.
Figure 3B:
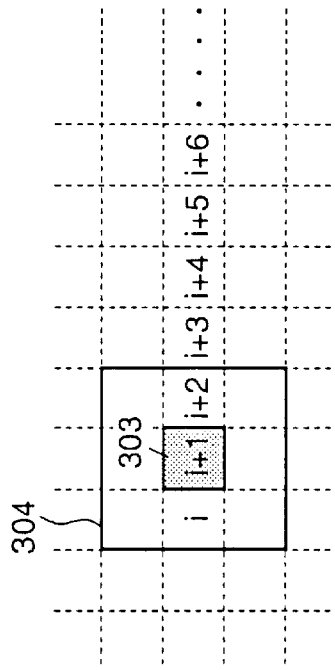
FIGS. 3A, 3B and 3C are views showing the sequential changes of the object block and the search area in the prior art.
Figure 3C:
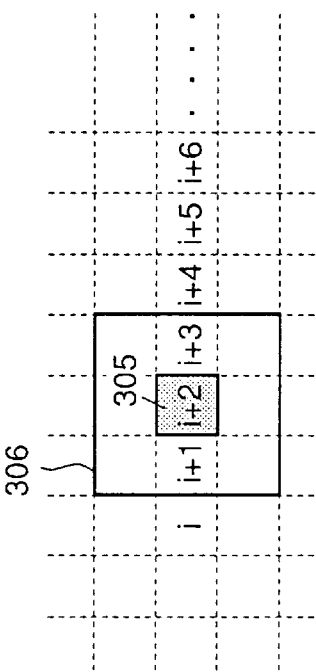
Figure 3A:
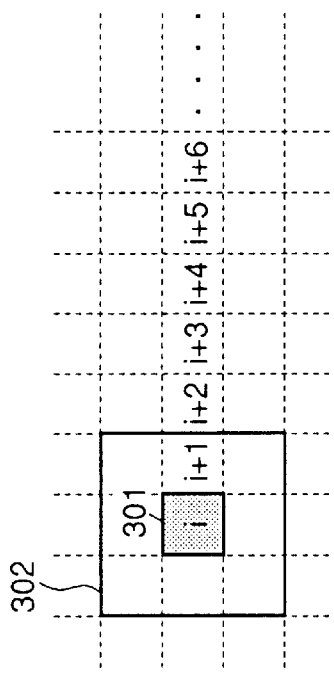
Figure 4B:
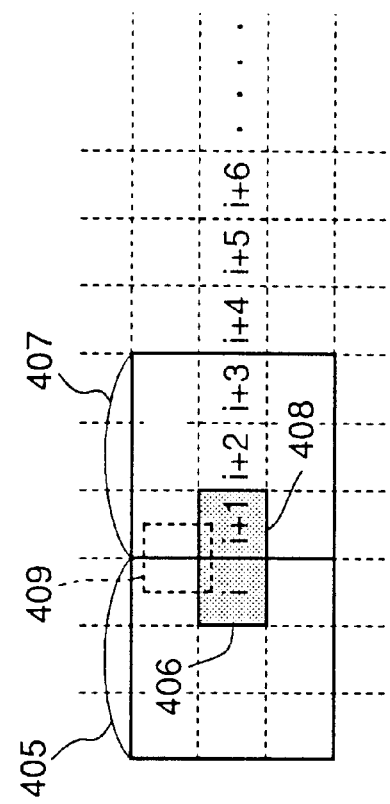
FIGS. 4A and 4B are views showing the prior art system for widening the search area.
Figure 4A:
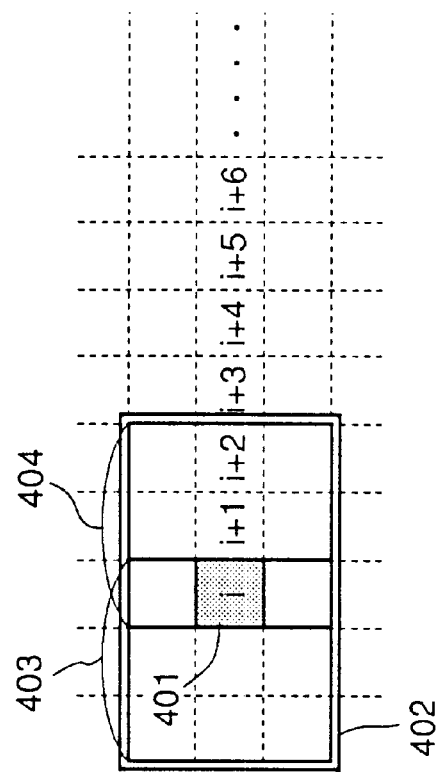
Figure 5:
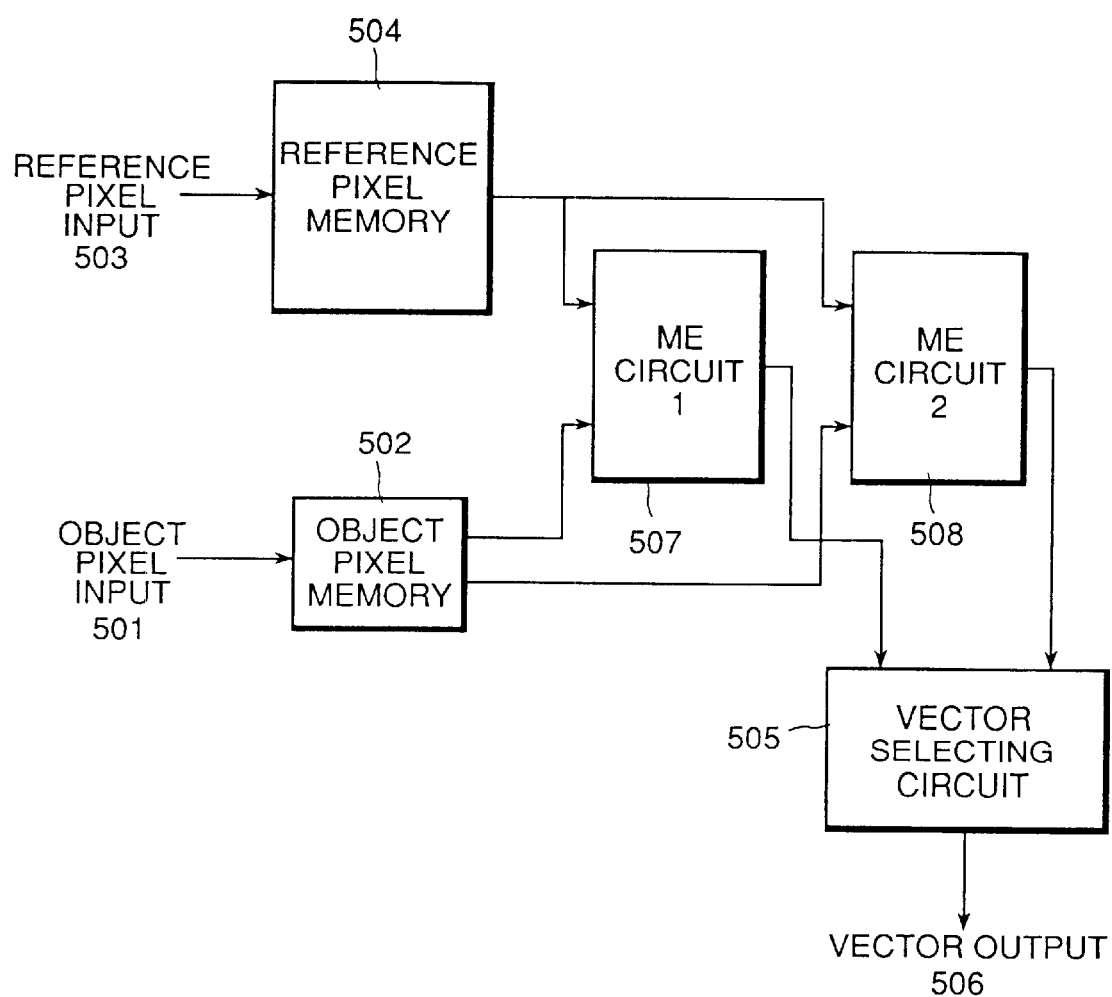
FIG. 5 is a block diagram showing the configuration of the first embodiment of the present invention.

FIG. 5 is a block diagram showing a first embodiment of the present invention. The pixels of an object block which are input from an object pixel input 501 are stored in an object pixel memory 502. Reference pixels of search area which are input from a reference pixel input 503 are stored in a reference pixel memory 504.

The appropriately necessary pixel data are applied to ME circuits 507 to 508 from these pixel memories and the detected motion vectors and the block matching evaluation values are input to a vector selecting circuit 505 and the lowest evaluation value is output as a final result from a motion vector output 506.

In accordance with the present invention, widening of the search area is achieved by simultaneously applying the same reference pixel data of the search area stored in the reference pixel memory 504 to respective ME circuits and applying data in different block positions to respective ME circuits as pixel data of an object block.

Figure 6A:
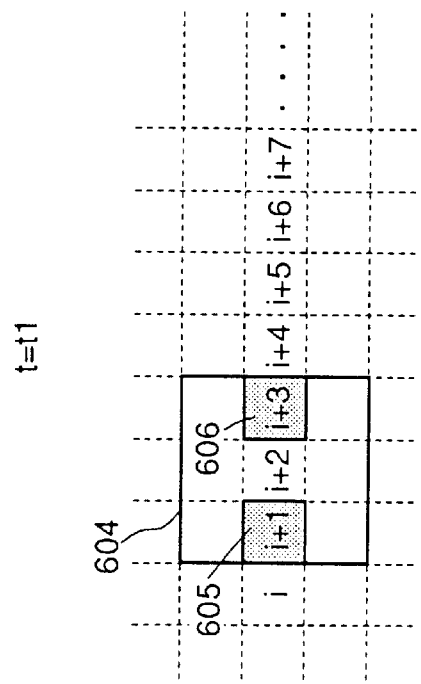
FIGS. 6A, 6B, 6C and 6D are views showing sequential changes of the object block and the search area in the first embodiment.
Figure 6B:
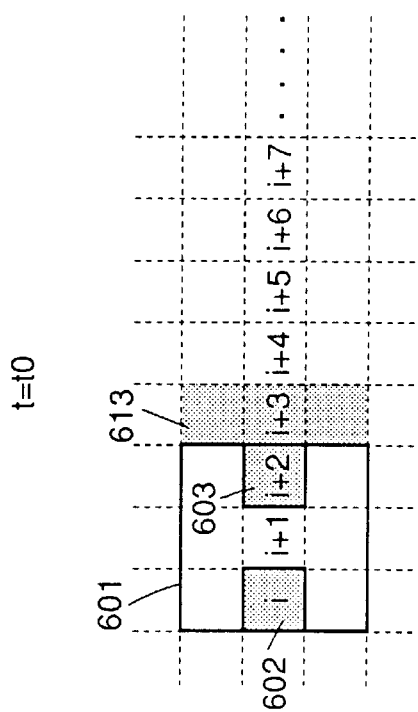
Figure 6C:
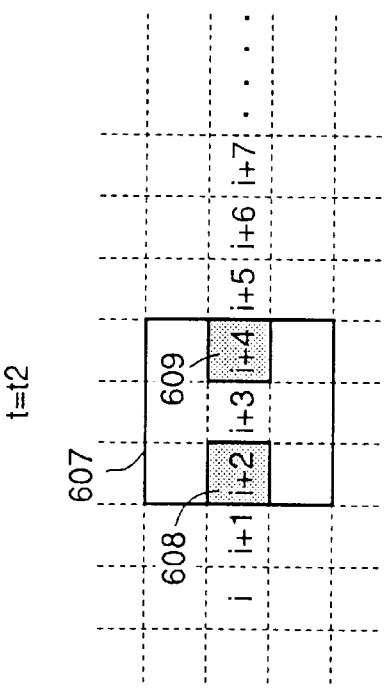

The relation between the object block and the search area and its changes with time is shown in FIGS. 6A to 6C. A search area for one object block (block i+2) is shown in FIG. 6D.

In the drawing, halftone dotted block (except 613) is the object block and a square surrounding the object block which is represented by a solid line is the search area.

Figure 6D:
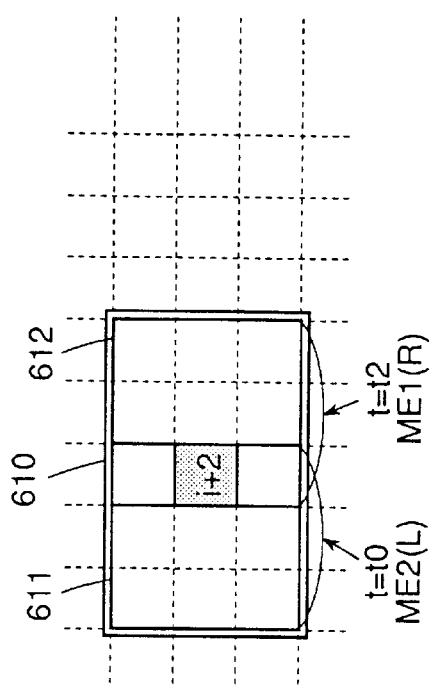

In this embodiment, the search area for an object block has the dimension 5m by 3m (610) in FIG. 6D which is divided into two sub-search areas 611 and 612, each having 3m by 3m, which partially overlap. Motion vector detection for respective sub-search areas is conducted at different times in different ME circuits.

As shown in FIGS. 6A to 6C, sequential operation comprises simultaneously applying pixel data of sub-search areas, each having 3m by 3m, to respective ME circuits and then applying pixel data in position of halftone dotted object block, separately, to respective ME circuits.

FIG. 6A shows the search position at time t=t0. At this time, motion vector detection in the range of right sub-search area 601 of the object block 602 is conducted in the ME circuit 507 for the pixel data of the object block 602 in block position i.

Simultaneously with this, motion vector detection in the same range of the left sub-search area 601 of the object block 603 is conducted in the ME circuit 508 for the object block 603 in position i+2.

At subsequent time t=t1, as shown in FIG. 6B, motion vector detection is conducted in position at which both object block and sub-search area is shifted rightward by one block. Motion vector detection in the range of right sub-search area 604 for the object block 605 is conducted in ME circuit 507 for the object block 605 in position i+1. Motion vector detection in the same range of left sub-search area 604 for the object block 606 is conducted in ME circuit 508 for the object block 606 in position i+3.

The pixel data of the sub-search area which is newly necessary when the sub-search area is shifted rightward by one block is only that at area 613. Accordingly, the pixel data which is to be newly input to the reference pixel memory 504 is only 3 by (m by m).

At next time t=t2, motion vector detection in position shifted rightward by one block will be conducted.

Motion vector detection in the range of right sub-search area 607 for the object block 608 is conducted in ME circuit 507 for the object block 608 in position i+2. Motion vector detection in the range of left sub-search area 607 for the object block 609 is conducted in ME circuit 508 for the object block 609 in position i+4.

Figure 7:
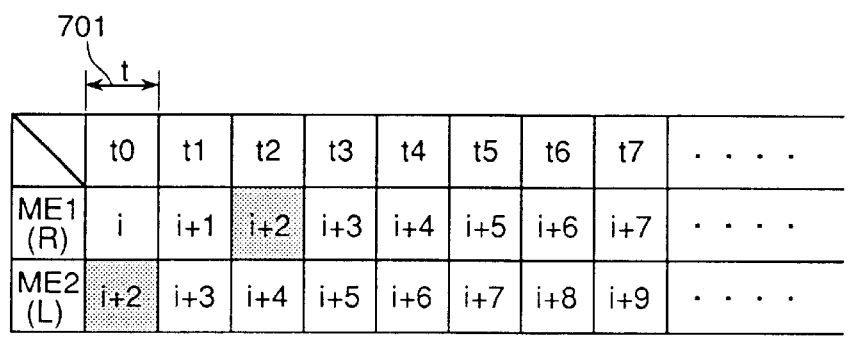
FIG. 7 is a view showing the order of processing in each ME circuit in the first embodiment.

FIG. 7 shows which object block the motion vector detection is conducted for in each ME circuit at respective times. t(701) denotes the time which is taken to process one block.

Since ME1 performs the motion vector detection at the right area for the object block as is apparent from FIG. 6, it is suffixed with (R). Since ME2 performs the motion vector detection at the left area, it is suffixed with (L).

An object block i+2 will be considered. At time t=t0, the motion vector detection in the left sub-search area is performed by ME circuit 508.

At subsequent time t=t2, the motion vector detection at the right sub-search area is performed in ME circuit 507. At time t=t2, a comparison between the block matching evaluation value which is a result of the ME circuit 508 and the block matching evaluation value which is a result of the ME circuit 507 determines which of the motion vectors of the ME circuits should be output as an ultimate result.

Figure 8:
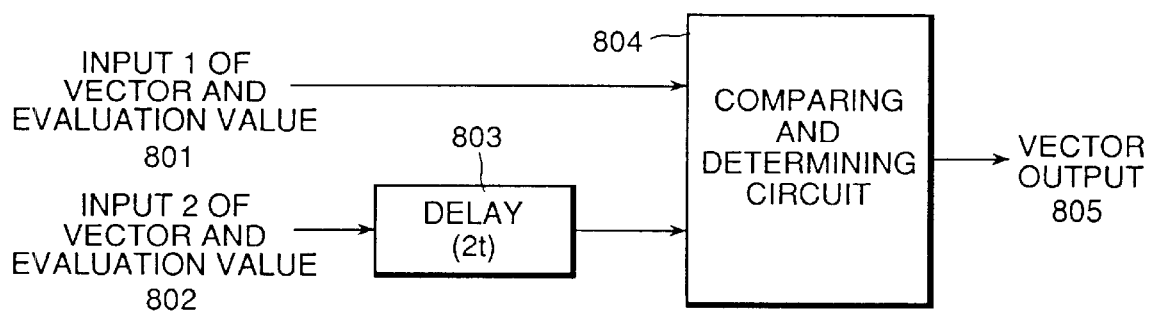
FIG. 8 is a block diagram showing the configuration of a vector selecting circuit in the first embodiment.

This determination may implemented by the vector selecting circuit as shown in FIG. 8. The vector selecting circuit may comprise an input 801, to which the motion vector from the ME circuit 507 and the block matching evaluation value are input, an input 802 to which the motion vector from the ME circuit 508 and the block matching evaluation value are input, a delay 803 for delaying the motion vector and the block matching evaluation value, a comparing and determining circuit 804 which compares the block matching evaluation values with each other to select the motion vector having less value and a motion vector output 805.

The reason why the delay 803 is provided is that the time when the motion vector detection is performed is different between the right and left sub-search areas for a given object block as mentioned above.

Delaying the motion vector and the block matching evaluation value by the time of 2t by this delay enables the results of the motion vector detection of right and left search areas for the same object block to be compared with each other.

Although present embodiment intends to widen the search area in a horizontal direction, widening of the search area in a vertical direction is made possible by making the delay 2t into 2tH.

Designation tH denotes a period of time which is taken to process one column of the object block in a horizontal direction.

A second embodiment of the present invention will now be described. FIG. 9 shows the configuration of the second embodiment. The configuration is identical with that in FIG. 5 except that the number of ME circuits increases to 4. Thus, description of each component will be omitted.

In the present embodiment, the search area is widened vertically or horizontally by using four ME circuits.

FIGS. 10A to 10G show the relation between the object block and the search area, its sequential changes and the search areas for a given block.

Designation tH denotes a period of time which is taken to process one column of the object block in a horizontal direction.

An object block 1031 in position i+2 in the present embodiment will be considered. As shown in FIG. 10G, the search area 1032 has a dimension of 5m by 5m. The search area is divided into four sub-search areas 1033, 1034, 1035 and 1036, the motion vectors of which are detected by respective different ME circuits at different times.

In FIG. 10G, the sub-search area 1033 is suffixed with UL since it is in the upper and left area as viewed from the object block and 1034, 1035 and 1036 are suffixed with UR, DL and DR since they are in the upper and right area, lower and left area, and lower and right area, respectively.

Figure 10B:
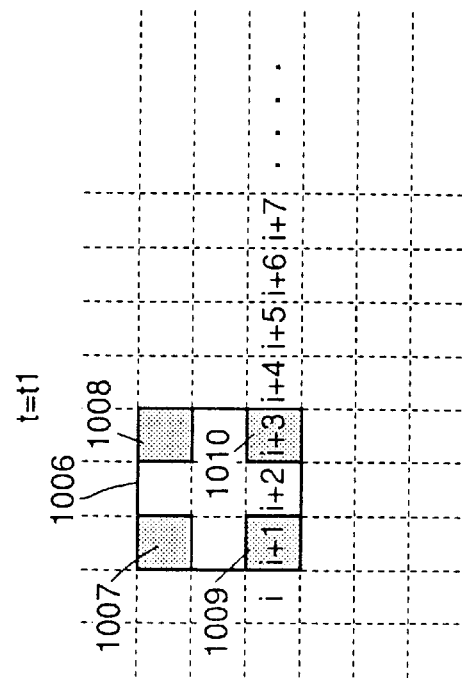
FIGS. 10A, 10B, 10C, 10D, 10E, 10F and 10G are views showing sequential changes of the object block and the search area in the second embodiment.
Figure 10A:
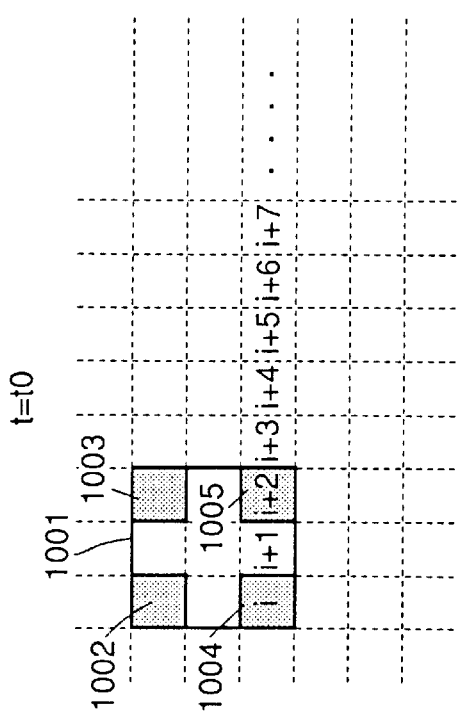

Sequential operation is illustrated in FIGS. 10A to 10F. FIG. 10A shows the search position at time t=t0. At this time, the pixel data of the sub-search area 1001 is simultaneously provided to ME circuits 907 to 910 from the reference pixel memory 904.

The pixel data of the object block are provided to ME circuit from the object pixel memory 902. The pixel data of the object block 1002 are provided to the ME circuit 909 and the sub-search area 1001 is used as the lower and right (DR) sub-search area for the object block 1002 so that the motion vector detection is performed.

Similarly, the pixel data of the object block 1003 are provided to ME circuit 910 and the sub-search area is used as the lower and left (DL) area The pixel data of the object block 1004 are provided to ME circuit 907 and the sub-search area is used as upper and right area. The pixel data of the object block 1005 are provided to ME circuit 908 and the sub-search area is used as upper and left (UL) sub-search area. Thus, respective motion vector detection is performed.

Figure 10C:
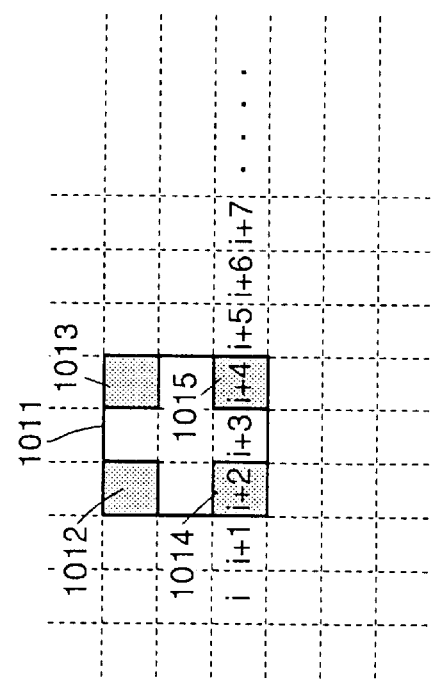

Similarly, motion vector detection is performed by sequentially shifting the object block and sub-search area in a rightward direction in FIGS. 10B and 10C.

Figure 10D:
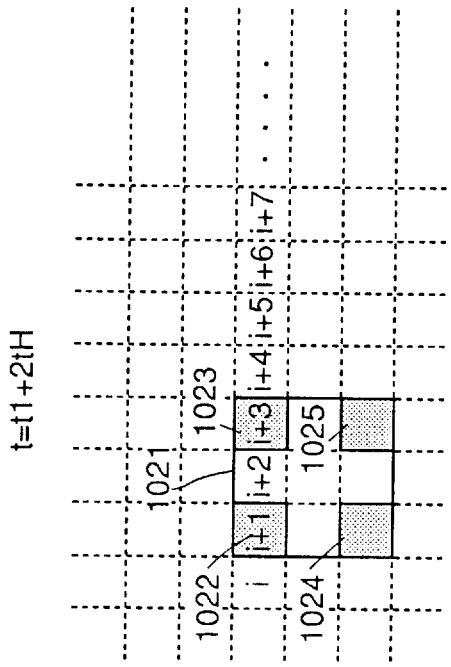
Figure 10E:
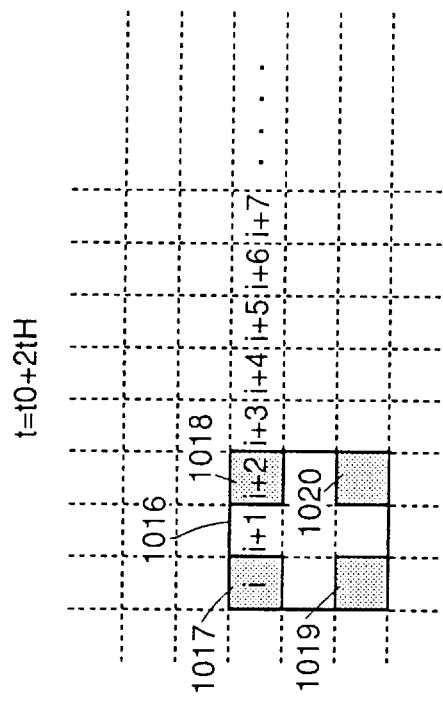
Figure 10G:
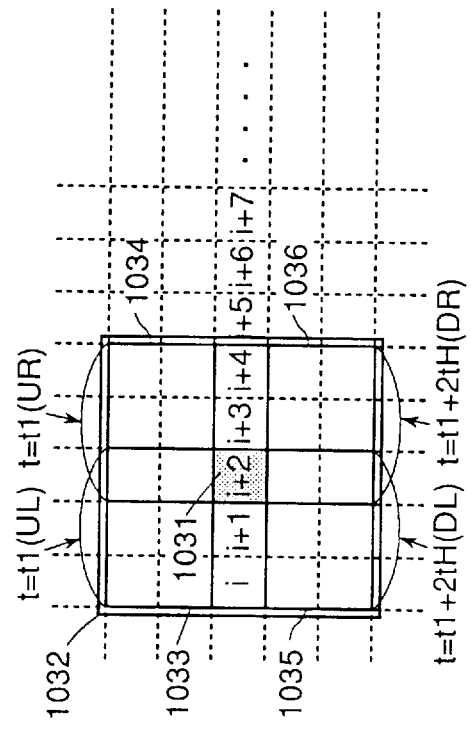
Figure 10F:
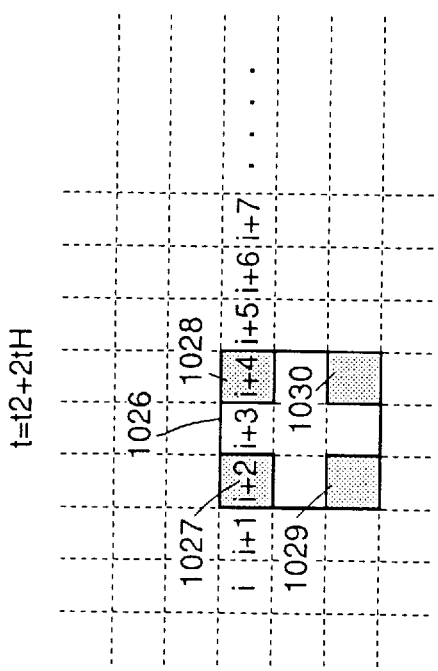

FIGS. 10D, 10E and 10F show the manner of the motion vector detection which is performed after shifting two columns of block in a horizontal direction.

Figure 11:
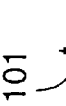
FIG. 11 is a view showing the order of processing in each ME circuit in the second embodiment.

FIG. 11 shows which object block search should be conducted for in each ME circuit on time axis.

Now, halftone dotted object block in position i+2 will be considered. At time t=t0, motion vector detection is performed in the sub-search area UL for this block. Motion vector detection is performed in the sub-search areas UR, DL and DR at time t=t2, t0+2tH, t2+2tH, respectively.

At time of t2+2tH, all results of four sub-search areas 1033 to 1036 are obtained for the object block 1031 as shown in FIG. 10G.

Figure 12:
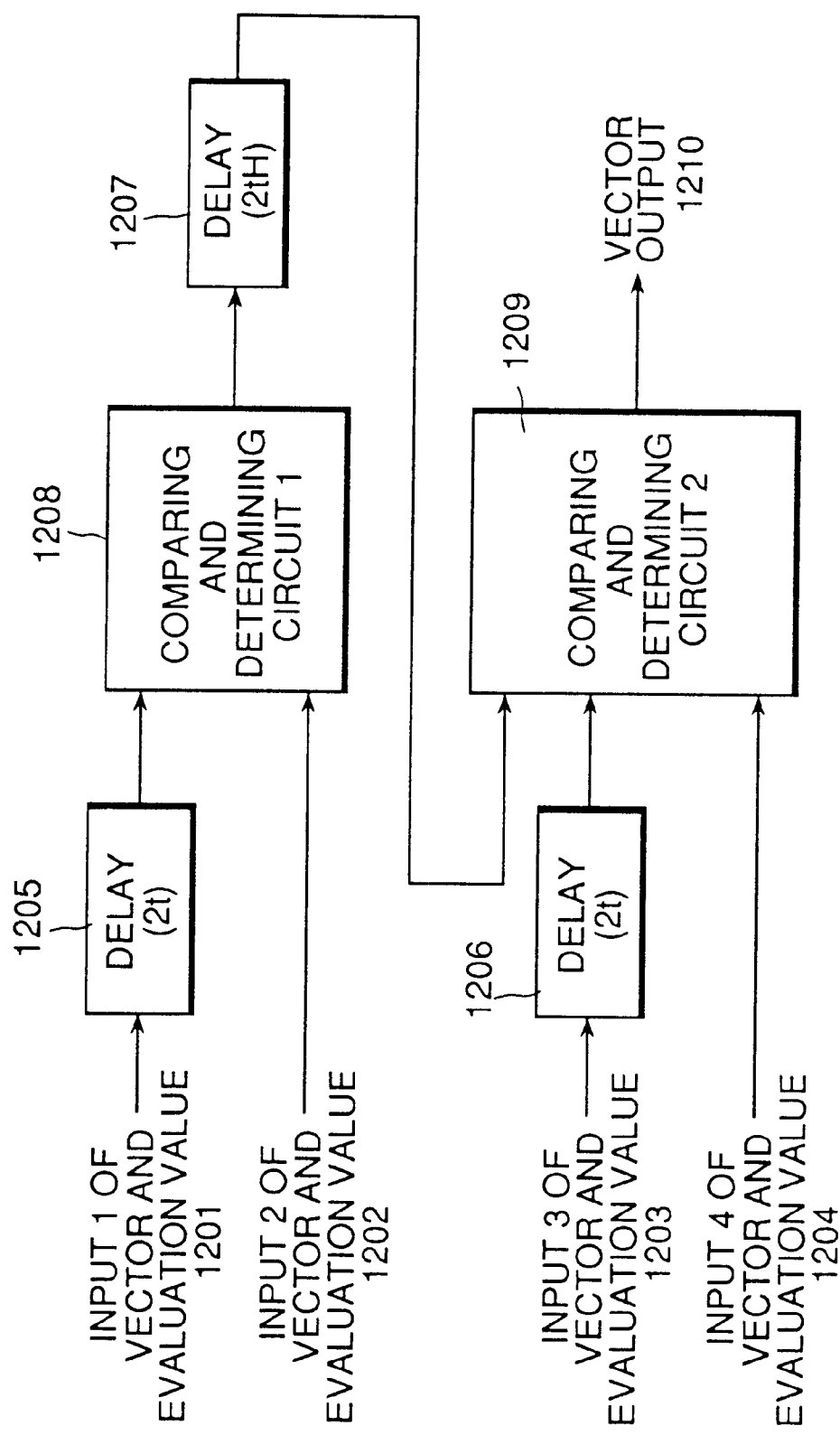
FIG. 12 is a block diagram showing the configuration of a vector selecting circuit in the second embodiment.

The results are processed by the vector selecting circuit 905 of FIG. 9 and a motion vector in the search area 1032 for the object block 1031 in position i+2 is output from 906 by selecting the least block matching evaluation value. The configuration of the vector selecting circuit 905 is shown in FIG. 12.

The vector selecting circuit 905 comprises inputs 1201 to 1204 of the block matching evaluation values and the motion vector data from the ME circuit in FIG. 9, delays 1205 and 1206 for delaying the signal by 2t, a delay 1207 for delaying the signal by 2tH, comparing and determining circuits 1208 and 1209 and a motion vector output 1210.

The data from the ME circuits 907, 908, 909 and 910 are input to 1201, 1202, 1203 and 1204, respectively.

Since the pixel data from the ME circuit 907 is shifted by 2t from the data from the ME circuit 908 for the same object block, the data from the ME circuit 908 is delayed by 2t by the delay 1205 and then input to the comparing and determining circuit 1208.

Similarly, the pixel data from the ME circuit 909 is also shifted by 2t from the data from the ME circuit 909 for the same object block, the data from the ME circuit 909 is delayed by 2t by the delay 1206 and then input to the comparing and determining circuit 1209.

Since the data from the ME circuits 907 and 908 are shifted by 2tH from those from the ME circuits 909 and 910, the output from the comparing and determining circuit 1208 is delayed by 2tH by the delay 1207 and then input to the comparing and determining circuit 1209 in which it is compared with the data from the ME circuits 909 and 910 so that final motion vector is output from 1210.

In the above-mentioned manner, motion vector detection in a search area having pixels 5m by 5m can be conducted for the object block having pixels m by m.

Although the reference pixel memory is shown separate from the ME circuit, the invention is applicable to the configuration in which reference pixels are stored in the ME circuits.

The advantages of the present invention are as follows.

All pixel data of the search area should be held in the prior art even if motion vector detection is conducted in a wider search area. In contrast to this, in accordance with the present invention, only pixels of the sub-search area which is assigned to each ME circuit should be held.

If the motion vector detection is performed in a search area having a dimension corresponding to 5 by 5 (in lateral and vertical direction) blocks in comparison with the dimension of an object block, a memory having a capacity for pixels of the search area corresponding to 5 by 5=25 blocks would be necessary in the prior art. In contrast to this, if ME circuits for the data of the search area corresponding to 3 by 3 blocks are used, only the pixels of the sub-search area corresponding to 3 by 3=9 blocks is required to be held.

Accordingly, remarkable reduction in memory capacity for the search area can be achieved.

In association with this, the amount of the data of the search area to be updated each time when one object block is processed in required to be less. Accordingly, the transfer rate of pixel data of the search area can be largely reduced.

What is claimed is:

1. A motion vector detecting device for detecting a motion vector by performing a block matching operation between an object frame to be encoded, which is divided into a plurality of blocks and a reference frame, said device comprising:
    a plurality of motion vector detecting circuits having a predetermined number of search areas;
    a reference memory for supplying common data to each of the motion vector detecting circuits as the data of the search areas; and
    an object memory for supplying data of the blocks in different positions to each of the motion vector detecting circuits as data of the object block to be encoded, wherein results output from each of the motion vector detecting circuits are delayed by time corresponding to a difference between positions of the object blocks to enable results of the same object blocks to be compared, whereby motion vector detection in a search area which is relatively wider than a given search area can be performed.

2. The motion vector detecting device of claim 1, further comprising:
    a vector selecting circuit for appropriately delaying results from the motion vector detecting circuits and for comparing results of an object block from each motion vector detecting circuit and selecting an appropriate motion vector result.

3. A motion detecting vector device for sequentially processing horizontally arrayed object blocks in a rightward direction starting with a leftmost block, said device comprising:
    two motion vector detecting circuits having search areas of a dimension of N by N blocks for an object block to be encoded;
    a reference memory for supplying data of common search areas to each of the motion vector detecting circuits; and
    an object block memory for supplying data of the object blocks to be encoded, which are separated by (N−1) blocks with each other in a horizontal direction, to each of the motion vector detecting circuits, wherein a result of the vector detection of the left object block is delayed by (N−1) t (wherein t denotes time which is taken to process one block) to enable results of the same object block to be compared, whereby the search area for one object block to be encoded is relatively widened to (2N−1)×N.

4. The motion vector detecting device of claim 3, further comprising:
    a vector selecting circuit for appropriately delaying results from the motion vector detecting circuits and for comparing results of an object block from each motion vector detecting circuit and selecting an appropriate motion vector result.

5. A motion vector detecting device for processing an image on a full screen by sequentially processing horizontally arrayed object blocks in a rightward direction starting with a leftmost block while scanning the block in a vertical downward direction starting with the uppermost block, said device comprising:
    two motion vector detecting circuits having search areas of a dimension of N by N blocks for an object block to be encoded;
    a reference memory for supplying data of common search areas to each of the motion vector detecting circuits; and
    an object block memory for supplying data of the object blocks to be encoded, which are separated by (N−1) blocks with each other in a vertical direction, to each of the motion vector detecting circuits, wherein a result of the vector detection of the upper object block is delayed by (N−1) tH (wherein tH denotes time which is taken to process one horizontal block line) to enable results of the same object block to be compared, whereby the search area for one object block to be encoded is relatively widened to N×(2N−1).

6. A motion vector detecting device as defined in claim 3, wherein said device comprises four motion vector detecting circuits having a search area of a dimension of N by N blocks for an object block to be encoded, common data of the search area being supplied to each of the motion detecting circuits, data of the object blocks at four upper right and left, and lower right and left corners of the search area, which are separated by (N−1) blocks in horizontal and vertical directions, are supplied to each of the motion vector detecting circuits, wherein results of the motion vector detection of the upper and left, upper and left, and lower and left object blocks are delayed by (N−1) (tH+t), (N−1)tH and (N−1)t, respectively (wherein t denotes time which is taken to process one block and tH denotes time which is taken to process one horizontal block line) to enable results of the same object block to be compared, whereby the search area for one object block to be encoded is relatively widened to (2N−1)×(2N−1).

7. The motion vector detecting device of claim 6, further comprising:

a vector selecting circuit for appropriately delaying results from the motion vector detecting circuits and for comparing results of an object block from each motion vector detecting circuit and selecting an appropriate motion vector result.

8. The motion vector detecting device of claim 5, further comprising:

a vector selecting circuit for appropriately delaying results from the motion vector detecting circuits and for comparing results of an object block from each motion vector detecting circuit and selecting an appropriate motion vector result.

9. A motion vector detecting method for detecting a motion vector by performing a block matching operation between an object frame to be encoded, which is divided into a plurality of blocks and a reference frame, said method comprising:

supplying common data from a reference memory to each of a plurality of motion vector detecting circuits, having a predetermined number of search areas, as the data of the search areas; and supplying data of the blocks in different positions to each of the motion vector detecting circuits as data of the object block to be encoded, wherein results output from each of the motion vector detecting circuits are delayed by time corresponding to a difference between positions of the object blocks to enable results of the same object blocks to be compared, whereby motion vector detection in a search area which is relatively wider than a given search area can be performed.

10. The motion vector detecting method of claim 9, further comprising:

appropriately delaying results from the motion vector detecting circuits;

comparing results of an object block from each motion vector detecting circuit; and selecting an appropriate motion vector result.

11. A motion detecting vector method for sequentially processing horizontally arrayed object blocks in a rightward direction starting with a leftmost block, said method comprising:

supplying data of common search areas from a reference memory to each of two motion vector detecting circuits having search areas of a dimension of N by N blocks for an object block to be encoded; and supplying data of the object blocks to be encoded, which are separated by (N−1) blocks with each other in a horizontal direction, to each of the motion vector detecting circuits, wherein a result of the vector detection of the left object block is delayed by (N−1) t (wherein t denotes time which is taken to process one block) to enable results of the same object block to be compared, whereby the search area for one object block to be encoded is relatively widened to (2N−1)×N.

12. The motion vector detecting method of claim 11, further comprising:

appropriately delaying results from the motion vector detecting circuits;

comparing results of an object block from each motion vector detecting circuit; and selecting an appropriate motion vector result.

13. A motion vector detecting method for processing an image on a full screen by sequentially processing horizontally arrayed object blocks in a rightward direction starting with a leftmost block while scanning the block in a vertical downward direction starting with the uppermost block, said method comprising:

supplying data of common search areas from a reference memory to each of two motion vector detecting circuits having search areas of a dimension of N by N blocks for an object block to be encoded; and supplying data of the object blocks to be encoded, which are separated by (N−1) blocks with each other in a vertical direction, to each of the motion vector detecting circuits, wherein a result of the vector detection of the upper object block is delayed by (N−1) tH (wherein tH denotes time which is taken to process one horizontal block line) to enable results of the same object block to be compared, whereby the search area for one object block to be encoded is relatively widened to N×(2N−1).

14. The motion vector detecting method of claim 13, further comprising:

appropriately delaying results from the motion vector detecting circuits;

comparing results of an object block from each motion vector detecting circuit; and selecting an appropriate motion vector result.

* * * * *